United States Patent
Rabinovitch et al.

(10) Patent No.: US 12,468,334 B2
(45) Date of Patent: Nov. 11, 2025

(54) CLOCK SIGNAL REALIGNMENT FOR EMULATION OF A CIRCUIT DESIGN

(71) Applicant: Synopsys, Inc., Mountain View, CA (US)

(72) Inventors: Alexander Rabinovitch, Shrewsbury, MA (US); Manish Shroff, Milford, MA (US); Baijayanta Ray, Bangalore (IN)

(73) Assignee: Synopsys, Inc., Sunnyvale, CA (US)

(*) Notice: Subject to any disclaimer, the term of this patent is extended or adjusted under 35 U.S.C. 154(b) by 624 days.

(21) Appl. No.: 17/870,374

(22) Filed: Jul. 21, 2022

(65) Prior Publication Data

US 2023/0035693 A1   Feb. 2, 2023

(30) Foreign Application Priority Data

Jul. 27, 2021   (IN) .............................. 202141033655

(51) Int. Cl.
| | |
|---|---|
| *G06F 30/3312* | (2020.01) |
| *G06F 1/12* | (2006.01) |
| *G06F 30/20* | (2020.01) |
| *G06F 30/347* | (2020.01) |
| *G06F 30/398* | (2020.01) |

(52) U.S. Cl.
CPC ............ *G06F 1/12* (2013.01); *G06F 30/3312* (2020.01); *G06F 30/20* (2020.01); *G06F 30/347* (2020.01); *G06F 30/398* (2020.01)

(58) Field of Classification Search
CPC ...... G06F 1/12; G06F 30/3312; G06F 30/347; G06F 30/398; G06F 30/20
USPC ............... 716/113, 108, 136; 703/28, 16, 17
See application file for complete search history.

(56) References Cited

U.S. PATENT DOCUMENTS

| | | | | |
|---|---|---|---|---|
| 5,548,620 A | * | 8/1996 | Rogers .................... | G06F 1/12 375/220 |
| 5,664,165 A | * | 9/1997 | Curry ....................... | G06F 1/12 713/501 |
| 5,758,132 A | * | 5/1998 | Stråhlin ................... | G06F 1/08 714/11 |
| 5,915,107 A | * | 6/1999 | Maley ...................... | G06F 1/12 713/400 |
| 5,987,081 A | * | 11/1999 | Csoppenszky ........ | H04L 7/0012 713/400 |
| 6,064,247 A | * | 5/2000 | Krakirian ................ | G06F 1/06 327/295 |
| 6,108,793 A | * | 8/2000 | Fujii ........................ | H03L 7/095 713/400 |

(Continued)

FOREIGN PATENT DOCUMENTS

EP              559322 A2 *  9/1993  ............. A21B 1/245

*Primary Examiner* — Phallaka Kik
(74) *Attorney, Agent, or Firm* — Patterson + Sheridan, LLP

(57) ABSTRACT

Circuit designs are emulated to verify the functionality of the circuit design. Emulating the circuit design includes obtaining a circuit design. The circuit design includes clock signals. Each of the clock signals is a data path clock signal. Further, a first clock signal of the clock signals is determined to be faster than a second clock signal of the clock signals. Rising edges and falling edges of the second clock signal are aligned with rising edges of the first clock signal to generate a realigned clock signal based on determining that the first clock signal is faster than the second clock signal. The circuit design is emulated using the realigned clock signal.

18 Claims, 9 Drawing Sheets

(56) References Cited

U.S. PATENT DOCUMENTS

| | | | | |
|---|---|---|---|---|
| 6,333,939 B1* | 12/2001 | Butler | | H04W 52/0216 |
| | | | | 370/503 |
| 6,424,197 B1* | 7/2002 | Salcedo | | H03K 5/133 |
| | | | | 327/276 |
| 6,446,249 B1* | 9/2002 | Wang | | G06F 30/331 |
| | | | | 326/38 |
| 6,653,867 B1* | 11/2003 | Shihadeh | | G06F 1/08 |
| | | | | 327/407 |
| 6,970,013 B1* | 11/2005 | Cory | | G06F 13/4018 |
| | | | | 326/38 |
| 9,230,046 B2* | 1/2016 | Asaad | | G06F 30/331 |
| 9,405,877 B1* | 8/2016 | Ramabadran | | G06F 1/10 |
| 10,573,360 B1* | 2/2020 | Ferreira | | G11C 11/4076 |
| 11,127,438 B1* | 9/2021 | Marom | | G11C 7/1072 |
| 11,868,694 B1* | 1/2024 | Mihajlovic | | G06F 30/396 |
| 12,353,809 B2* | 7/2025 | Rabinovitch | | G06F 30/396 |
| 2001/0014922 A1* | 8/2001 | Kuge | | G06F 13/4239 |
| | | | | 710/36 |
| 2002/0029117 A1* | 3/2002 | Ito | | G06F 1/12 |
| | | | | 702/79 |
| 2002/0083289 A1* | 6/2002 | Ryoo | | G11C 7/1084 |
| | | | | 711/200 |
| 2002/0162084 A1* | 10/2002 | Butts | | G06F 30/331 |
| | | | | 716/102 |
| 2003/0056135 A1* | 3/2003 | Splett | | G06F 1/3209 |
| | | | | 713/400 |
| 2003/0056137 A1* | 3/2003 | Huelskamp | | G06F 5/06 |
| | | | | 713/600 |
| 2005/0200393 A1* | 9/2005 | Furtner | | H03K 5/135 |
| | | | | 327/291 |
| 2007/0176662 A1* | 8/2007 | Scoville | | G06F 1/04 |
| | | | | 327/291 |
| 2007/0273410 A1* | 11/2007 | Miike | | G06F 1/08 |
| | | | | 327/99 |
| 2009/0153194 A1* | 6/2009 | Cumming | | H03K 5/15066 |
| | | | | 327/291 |
| 2009/0154266 A1* | 6/2009 | Fukumoto | | G06F 13/1689 |
| | | | | 365/233.13 |
| 2010/0205386 A1* | 8/2010 | Yamashita | | G11C 29/028 |
| | | | | 365/194 |
| 2011/0022789 A1* | 1/2011 | Fujimoto | | G06K 19/07 |
| | | | | 711/E12.001 |
| 2011/0214003 A1* | 9/2011 | Nara | | G06F 1/08 |
| | | | | 713/400 |
| 2012/0303994 A1* | 11/2012 | Bauernfeind | | G06F 5/12 |
| | | | | 713/400 |
| 2013/0246833 A1* | 9/2013 | Fukushima | | G06F 1/06 |
| | | | | 713/500 |
| 2013/0322462 A1* | 12/2013 | Poulsen | | G06F 13/3625 |
| | | | | 370/458 |
| 2014/0347941 A1* | 11/2014 | Jose | | G11C 7/222 |
| | | | | 365/191 |
| 2015/0121110 A1* | 4/2015 | Sima | | G06F 1/04 |
| | | | | 713/323 |
| 2021/0091756 A1* | 3/2021 | Iwata | | G06F 1/324 |
| 2021/0232742 A1* | 7/2021 | Korchemny | | G06F 30/3312 |

\* cited by examiner

CLOCK SIGNAL REALIGNMENT FOR EMULATION OF A CIRCUIT DESIGN

RELATED APPLICATION

This application claims the benefit of Indian provisional patent application serial number 202141033655, filed Jul. 27, 2021, which is hereby incorporated herein by reference.

TECHNICAL FIELD

The present disclosure relates to emulating circuit designs, and more particularly to realigning clock signals of a circuit design for emulation of the circuit design.

BACKGROUND

Circuit designs are emulated, i.e., prototyped, to test the functionality of the circuit designs. Emulation is performed based on the data path clock signals of the circuit design. A circuit design typically includes multiple clock signals used to drive sequential elements, for example flip flops, latches, memories, among others, of the circuit design. The clock signals are generated by clock generation circuitry of a circuit design. The frequencies of the clock signals differ from each other, such that one clock signal has a frequency that is higher than the frequency of the others. In addition to the clock signals generated from the primary clock generation circuitry of the design, over the rest of the design, two or more clock signals may be combined to generate a derived clock signal or a clock signal may be divided using clock division logic to form a divided clock signal. One or more of the circuit elements of the circuit design are driven based on one or more derived or divided clock signals.

SUMMARY

In one or more examples, a method includes obtaining a circuit design. The circuit design includes clock signals. Each of the clock signals is a data path clock signal. Further, the method includes determining, by a processor, that a first clock signal of the clock signals is faster than a second clock signal of the clock signals. The method further includes aligning rising edges and falling edges of the second clock signal with rising edges of the first clock signal to generate a realigned clock signal based on determining that the first clock signal is faster than the second clock signal. The method further includes emulating the circuit design using the realigned clock signal.

In one or more examples, a system includes a memory storing instructions, and a processor. The processor is coupled with the memory and executes the instructions. The instructions when executed cause the processor to obtain a circuit design. The circuit design comprising clock signals. Each of the clock signals is a data path clock signal. Further, the processor is caused to determine that a first clock signal of the clock signals is faster than a second clock signal of the clock signals. The processor is further caused to align rising edges and falling edges of the second clock signal with rising edges of the first clock signal to generate a realigned clock signal based on determining that the first clock signal is faster than the second clock signal. Further, the processor is caused to emulate the circuit design using the realigned clock signal.

In one or more examples, a non-transitory computer readable medium includes stored instructions. The instructions, when executed by a processor, cause the processor to obtain a circuit design. The circuit design comprising clock signals. Each of the clock signals is a data path clock signal. The processor is further caused to determine that a first frequency of a first clock signal of the clock signals is higher than a second frequency of a second clock signal of the clock signals and a third frequency of a third clock signal of the clock signals. Further, the processor is caused to group the second clock signal and the third clock signal based a ratio of the first clock signal relative to the second clock signal and the third clock signal into one or groups. Further, the processor is caused to align the second clock signal and the third clock signal with the first clock signal based on the grouping of the second clock signals and the third clock signal to generate realigned clock signals. The processor is further caused to emulate the circuit design using the realigned clock signals.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
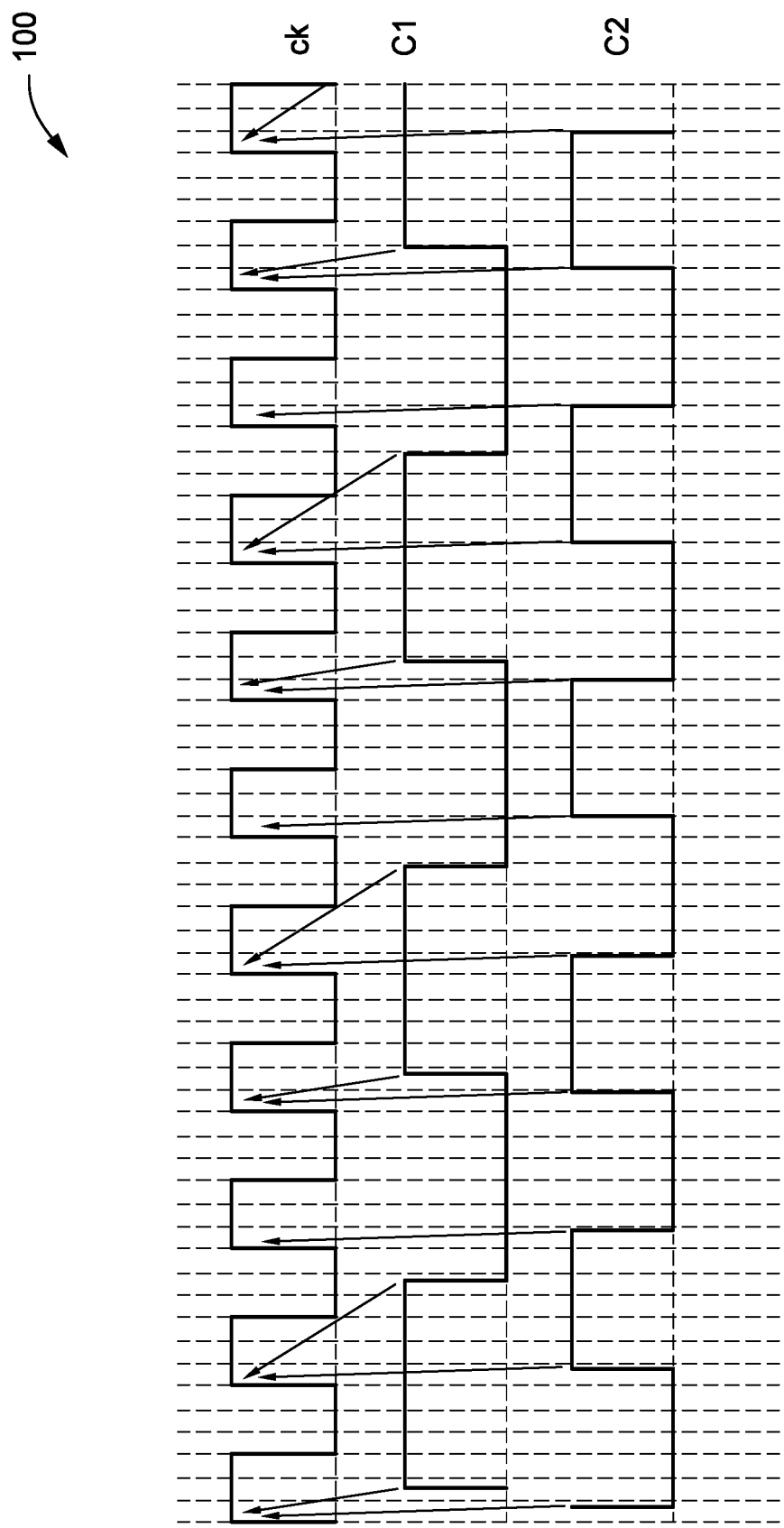
FIG. 1 illustrates a waveform diagram of data path clock signals, according to one or more examples.

Aspects of the present disclosure relate to clock signal realignment for emulation of a circuit design.

A circuit design is emulated or prototyped, to test the functionality of the circuit design. Such a circuit design is referred to as a design under test (DUT). A DUT typically includes multiple primary clock signals. These clock signals drive the circuit elements of the DUT. Different portions of the DUT may be driven with different clock signals. The clock signals are generated by clock generation circuitry of the DUT. The clock generation circuitry generates clock signals having different frequencies. The frequencies of the clock signals are determined based on the design parameters of the DUT. In one or more examples, each of the data path clock signals is associated with a different clock domain.

In one or more examples, a DUT has a fast clock signal and a group of slow clock signals. The frequencies of the slow clock signals are less than that of the fast clock signal. Derived clock signals are used to drive portions of the circuit design. A derived clock signal is a clock signal that is derived from two or more clock signals. A derived clock signal may be generated by combining two or more clock signals through the use of a logic gate such as an AND gate, OR gate, XOR gate, and a MUX gate, among others. A derived clock signal may also be generated out of a clock division logic and referred to as divided clock signal. In one example, a derived clock signal that is derived from two or more slow clock signals of a DUT may have a different frequency from that of the two or more slow clock signals. Further, due to the distance between rising edges of the two or more slow clock signal, the frequency may be different than that expected by downstream circuit elements. Accordingly, data paths controlled by such derived clock signals may not be routed as multi-cycle paths during emulation, negatively affecting the performance of the emulation process.

In one or more examples, two or more clock signals are divided or derived from a pair of data path clock signals. In such an example, a data path controlled by the divided clock signals may not be routed as a multi-cycle path. Further, a data path controlled by the divided clock signals may not be controlled by a combinational function of the divided clock signals. Accordingly, as a large portion of a DUT may be driven by divided clock signals, the divided clock signals as described above negatively affect the performance of the emulation process.

Technical advantages of the present disclosure include, but are not limited to, aligning the data path clock signals such that the rising and falling edges of slower data path clock signals are aligned with rising edges of faster data path clock signals. In one or more examples, aspects of the present disclosure relate to realignment of data path clock signals to ensure that multi-cycle path properties may be used when emulating a DUT. Accordingly, the efficiency of the emulation process is improved, reducing the amount of time used to emulate a DUT.

During the emulation or a prototyping process of a DUT within one or more field programmable gate arrays (FPGAs), the ability to prove that a data path needs to arrive in multiple emulation cycles, or K emulation cycles, as opposed to 1 emulation cycle (where an emulation cycle is defined as the one cycle of a fastest clock signal) is crucial to drive the placement and routing solutions. Further, the knowledge that a path is not critical allows routing resources to be distributed to and used for more critical paths. Also partitioning the DUT in a manner when multi-cycle paths cross the partition boundaries is more beneficial for performance because crossing FPGA and hardware units is usually slower than propagation inside the FPGA and having a less critical path at FPGA crossing is less costly than crossing a critical path.

In one or more example, a DUT includes more than one primary clock signal that is subjected to emulation. Emulation has various techniques that map discrete events when clock signals transition between rising edges and falling onto distinct emulation clock cycles (e.g., cycles of an emulation clock signal). In one or examples, one or more clock signals of a DUT changes at every emulation cycle.

During emulation, clock signals of a DUT are mapped onto the timeline of the emulation cycles by dedicating a unique emulation cycle to every unique point in time as follows from definition of the clock signals. For example, for a DUT having clock signals c1 and c2, in a case that:

always #3 c1=~c1;
always #5 c2=~c2;

In such an example, the respective signals of clock signal c1 and clock signal c2 transition between rising and falling edges as follows: at time period 0 (clock signal c1, clock signal c2), at time period 3 (clock signal c1), at time period 5 (clock signal c2), at time period 6 (clock signal c1), at time period 9 (clock signal c1), at time period (clock signal c2), at time period 12 (clock signal c1), at time period 15 (clock signal c1, clock signal c2), and then the pattern of time periods repeats. Every unique time period in the pattern corresponds to a distinct emulation cycle.

After transition (e.g., a transition between rising and falling edges) of the clock signal c1 at time period 3, the clock signal c1 changes again 2 emulation cycles later. However, after transition of the clock signal c1 at the time period 6, the clock signal c1 changes again in next emulation cycle.

In one or more examples, a DUT includes clock signal CK and clock signal C. The clock signal CK is faster than the clock signal C. The clock signal CK has a higher frequency than that of the clock signal C. In such examples, the emulation timeline mitigates throughput issues based on a specified speed ratio between clock signal CK and clock signal. The ratio between the clock signals can be defined as frequency(CK)/frequency(C), or provided by the corresponding DUT. In case of speed ratio m/n, for every "m" changes of the clock signal CK there are "n" changes of the clock signal C. Further, in examples where the clock signal CK is faster than the clock signal C, "m" is greater than or equal to "n". Accordingly, the n events of the clock signal C, where the clock signal is transition between rising and falling edges, can be mapped onto m events of the clock signal CK. Further, the pattern of mapping n changes of the clock signal C onto m changes of clock signal CK can be repeated. Using such a mapping allows each of the emulation cycles to correspond to a unique change of the clock signal CK, in case where the number of emulation cycles is equal to the number of changes of the clock signal CK. Such an emulation process is considered to have low throughput congestion as there are not more emulation cycles than number of changes of a clock signal (e.g., the clock signal CK). Such a mapping also ensures that the speed ratio between the clock signal CK and the clock signal C is preserved.

In one or more examples, a DUT includes synchronization logic to synchronize different clock domains. In one example, synchronization logic synchronizes the clock domains of the clock signals C1 and C2. In such examples, as long as the frequency ratio between clock signals C1 and C2 is maintained over time, the corresponding DUT is determined to be functional. In one example, the DUT further includes the clock signal CK. The clock signal CK is the fastest clock signal of the DUT. If both the clock signal C1 and the clock signal C2 are mapped onto transitions of the clock signal CK as described above, the frequency ratio between the clock signal CK and the clock signal C1 and the frequency ratio between the clock signal CK and clock signal C2 are maintained. Accordingly, the frequency ratio between the clock signals C1 and C2 is also maintained. Further, the particular distribution of n transitions of the clock signal C1 over m transitions of the clock signal CK does not affect the functionality of the DUT.

In one example, a DUT includes clock signals CK, C1, C2, ..., Cp. P is greater than or equal to 2. The clock signal CK is faster than the clock signals C1, C2, ..., Cp. For example, the frequency of the clock signal CK is higher than that of the clock signals C1, C2, ..., Cp.

In one or more example, the transitions (e.g., events) of the clock signals C1 and C2 are mapped onto the transitions of the clock signal CK during the emulation process. Mapping the clock signals C1 and C2 onto the clock signal CK ensures that a combination of the clock signal C1 and C2 remains slower than the clock signal CK. Accordingly, multi-cycle path optimizations may be utilized during the emulation process. For example, in the above case, if clock signal C1, or clock signal C2 or any combination of clock signal C1 and clock signal C2 are proven to slower than half the frequency of clock signal CK, all paths within the circuit design that are clocked (driven) by the clock signals C1, C2 or any such combined clocks, can be assumed to have a multi cycle path of 2 or more. Further, timing on such a path can be relaxed to be a multiple of period of the clock signal CK.

In the example where the clock signal CK is the fastest clock signal for the DUT (e.g., has the highest frequency), the clock signals C1, C2, ... Cp are divided into groups based the ratio of the clock signals C1, C2, ... Cp relative to the clock signal CK. For example, the clock signals are grouped into the following groups:

Group 1: clock signals faster or equal than ½ the clock signal CK and slower than the clock signals CK;
Group 2: clock signals faster or equal than ¼ the clock signal CK and slower than ½ the clock signal CK;
Group 3: clock signals faster or equal than ⅛ the clock signal CK and slower than ¼ the clock signal CK; and
Group j: clock signals faster or equal than $1/(2^{}j)$ the clock signal CK and slower than $1/(2^{}(j-1))$ the clock signal CK.

In one example, a clock signal C is a clock signal of the DUT. In such an example, the ratio between clock signals is m/n or "clock signal CK/clock signal C". Further, the clock signal C is a clock signal of Group 2 as defined above. In such an example, m=2n+k for non-negative integer k, and the clock signal C is at least twice as slow as the clock signal CK. N events (e.g., transitions) of the clock signal C are mapped onto every second event of the clock signal CK. In one example, N is odd. In such an example, 2n events of the clock signal C are mapped onto 2m events of the clock signal CK, such that every second transition of the clock signal CK coincides with the next transition of the clock signal C. Further, the transitions of the clock signal C occur during rising edges (e.g., positive edge or posedge) of the clock signal CK, which is every second emulation cycle. In one example, the clock signal C4 is part of the Group j. In such an example, 2n events of the clock signal C4 is mapped onto 2m events of the clock signal CK, such that events of clock signal C4 are mapped onto every $2^{}(j-1)$ transition of the clock signal CK. In other words, there are $2^{}(j-1)$ transitions of the clock signal CK between 2 consecutive transitions of C. Such a method can be applied to any value of "j", including 1.

Reconstructing the emulation timeline as described above ensures slow speed properties for a combination of slow clock signals. For example, a combination of two slow clock signals is a slow clock signal (e.g., slower than the faster clock signal of the DUT). In one example, clock signals C1, C2, are C3 are part of Group j. For a combinational function clock signal clk=comb(C1, C2, C3), the value of the clock signal clk changes only every $2^{}(j)$ transitions of the clock signal CK, and every $2^{}(j)$-th emulation cycle. The combinational function is a logic function of an AND gate, an OR gate, a multiplexer (MUX), or an XOR gate, among others. In such an example, the data path with respect to the clock signal clk is multiple clock paths in the emulation process. Accordingly, processes such as partitioning, placement and routing can take advantage of the multiple clock paths. Further, if all the sources of a combinational function are synchronized by the same edge of clock signals C1, C2, and/or C3, the changes of the clock signal clk are $2^{}(j+1)$ emulation cycles apart. In an example, where a combinational function is formed by clock signals of the group j and groups larger than group j, the combinational product of such clocks signals still changes only at every $2^{}j$-th emulation cycle.

FIG. 1 illustrates a waveform diagram 100 of clock signals C1 and C2 of a DUT. FIG. 1 illustrates mapping rising and falling edges from slower clock signals to rising edges of faster clock signals, according to certain embodiments. The DUT includes clock signals CK, C1, and C2. In other examples, the DUT includes additional clock signals.

The clock signals CK, C1, and C2 are data path clock signals. For example, the clock signals CK, C1, and C2 are generated by clock generator circuitry (e.g., clock generator circuitry 310 of FIG. 3). Further, the clock signals CK, C1, and C2 are not generated from each other.

The clock signal CK is the faster (e.g., has a higher frequency) than the clock signals C1 and C2. For example, the frequency of the clock signal CK is at least twice the frequency of the clock C1 and C2, such that the clock signals C1 and C2 are at least twice as slow as the clock signal CK. The period of the clock signal C1 divided by the period of the clock signal CK is greater than 2, and the period of the clock signal C2 divided by the period of the clock signal CK is greater than 2. Accordingly, the time line of the clock signals C1 and C2 can be rearranged such that the edges (e.g., rising and falling edges) of the clock signals C1 and C2 are mapped onto rising edges (e.g., positive edges) of the clock signal CK. The clock signals C1 and C2 are rearranged such that at least one half period of C1 and C2 occur for every period of the clock signal CK. No value change events shall be lost for the clock signals C1 and C2, and the effective frequency of the clock signals C1 and C2 remain same after the clock signals C1 and C2 are rearranged.

Mapping the rising and falling edges of a slower clock signal onto the rising edges of a faster clock signal is applied to the clock signals of Group 2-Group J as described above. In one example, mapping the rising and falling edges of a slower clock signal onto the rising edges of a faster clock signal is applied to the clock signals that are at least twice as slow as the fastest clock signal, and may include clock signals of Group 1 as described above.

As the clock signals C1 and C2 are based on the clock signal CK, the data paths of the clock domains of the clock signals C1 and C2 are at least a full period of the clock signal CK. Further, a data path controlled by any combinational functions of any number of the clock signals C1 and C2 is at least full period of the clock signal CK.

As will be described in more detail in the following, one or more clock signals that have a frequency that is at greater than half of the frequency of the fastest clock signal (e.g., the clock signal CK), and is less than the frequency of the fastest clock signal. These clock signals can be rearranged, such that respective divided clock signals that are produced at a corresponding edge of the clock signals satisfy the property that a data path controlled by a divided clock or a combination function is at least a full period of the fastest clock signal.

Figure 2:
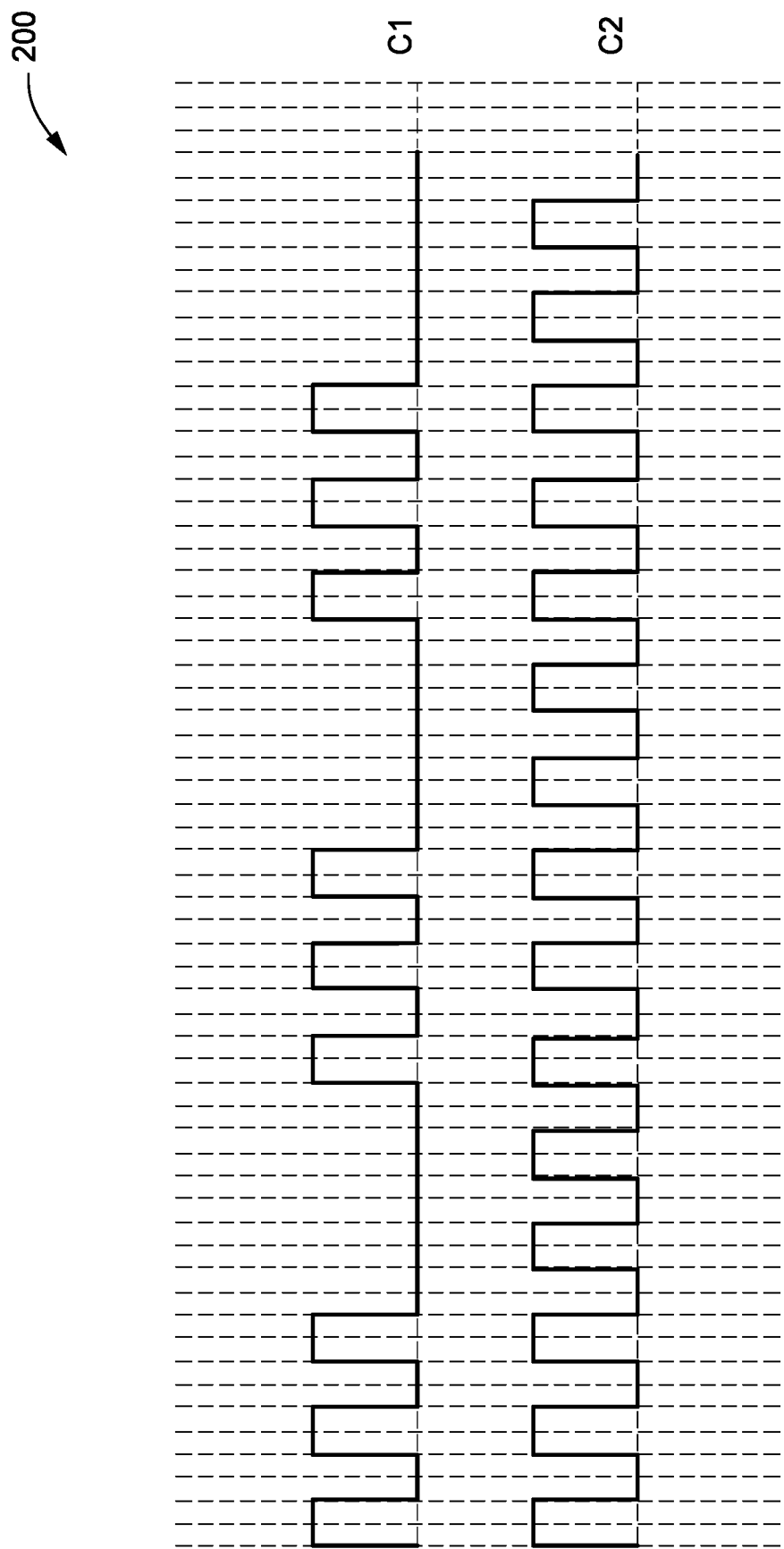
FIG. 2 illustrates a waveform diagram of data path clock signals, according to one or more examples.

FIG. 2 depicts a waveform diagram 200 for dividing clock signals to rearrange clock timing for purposes of edge alignment within a DUT. As is illustrated in FIG. 2, the clock signal C1 is faster than the clock signal C2. The ratio of the frequency of the clock signal C1 to the frequency of the clock signal C2 is 3/5, and there are six transitions of the clock signal C1 per ten transitions of the clock signal C2. The clock signals C1 and C2 are slower than the clock signal CK (not illustrated). The clock signals C1 and C2 are less than two times slower than the clock signal CK. For example, the clocks C1 and C2 are included within Group 2 as described above. In such an example, the clock signals C1 and C2 are re-arranged such that each rising edge of the clock signals C1 and C2 occurs at even emulation cycles. As is illustrated in FIG. 2, the clock signal C1 includes missing, or skipped, rising and falling edges. The missing rising and falling edges occur when mapping the clock signal C1 to the faster clock signal CK, not shown. In one or more example, the clock signals that are divided clock signals of the clock signals C1 and C2 have a rising edge that occurs at even emulation cycle. Further, combinations of a divided clock signal has a transitions at even emulation cycles.

Figure 3:
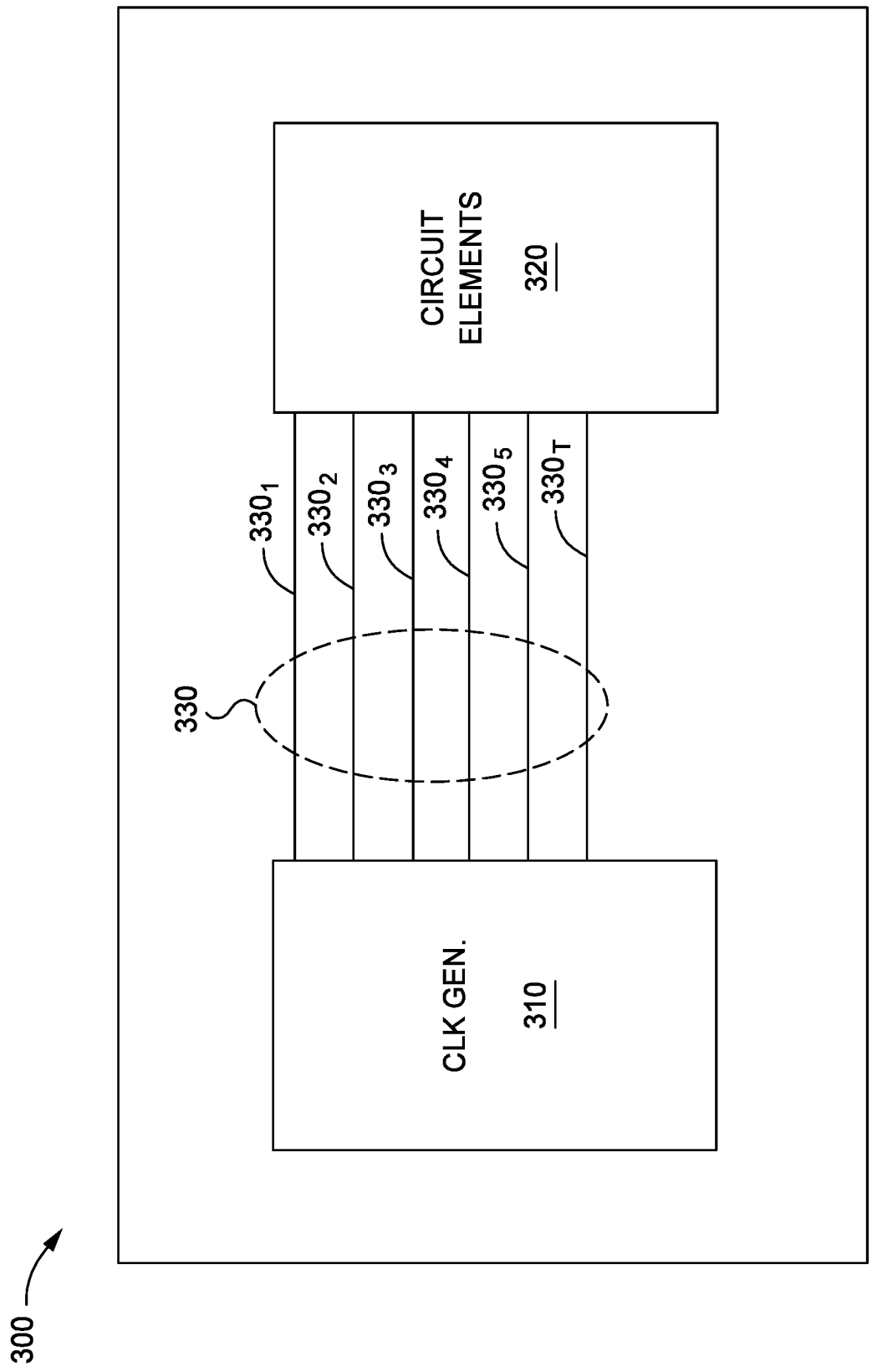
FIG. 3 illustrates a portion of a circuit design, according to one or more examples.
Figure 4:
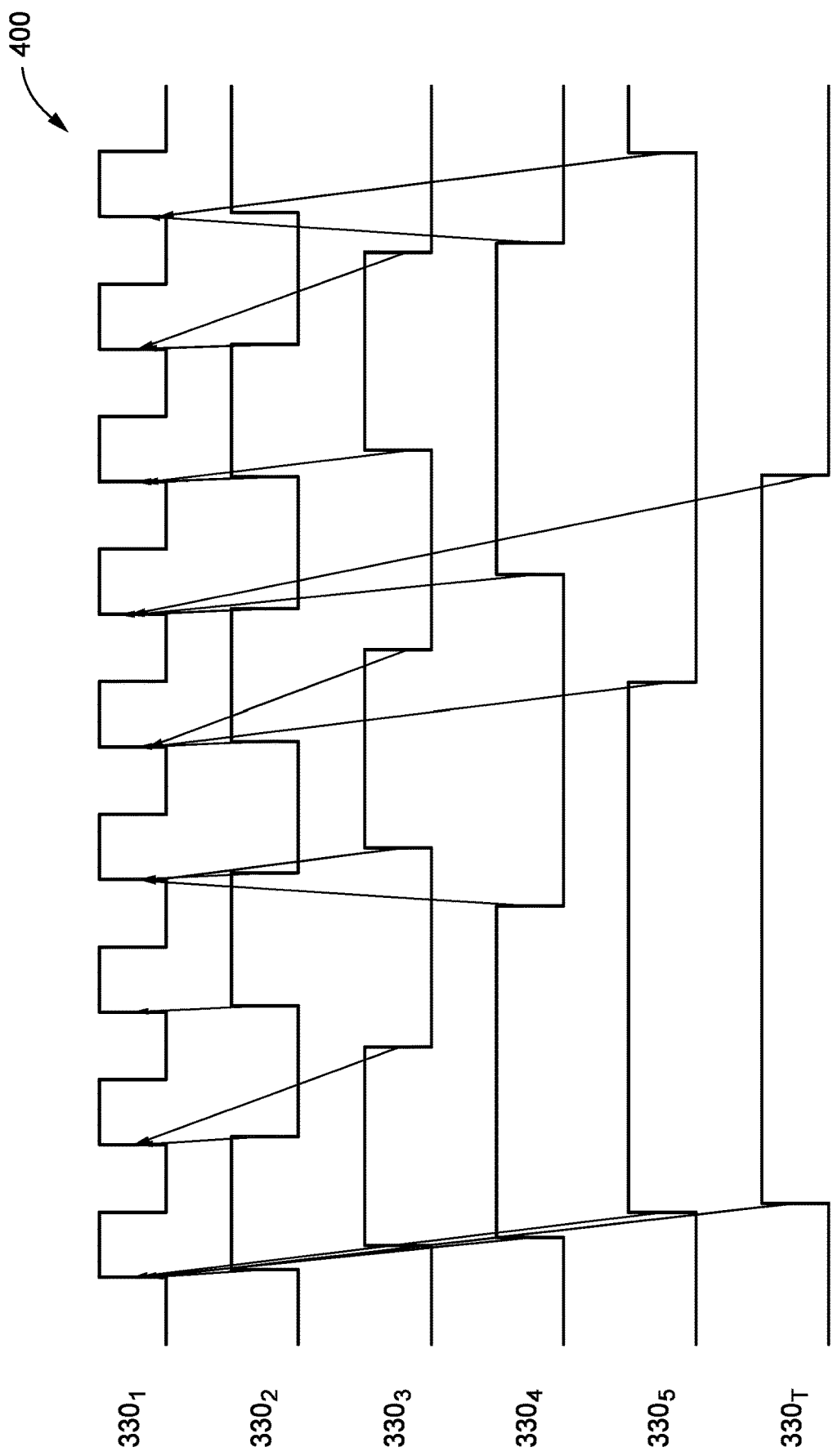
FIG. 4 illustrates a waveform diagram of data path clock signals, according to one or more examples.

FIG. 3 illustrates a DUT, circuit design, 300, according to one or more examples. The DUT 300 includes clock generator circuitry 310 and circuit elements 320. The clock generator circuitry 310 generates clock signals 330 which are output to the circuit elements 320. The clock signals 330 are data path clock signals. The clock signals 330 include clock signal $330_1$-$330_T$, where T is greater than 1. FIG. 4 illustrates waveforms of the clock signals $330_1$-$330_T$. The clock signal $330_1$ is the fastest clock signal, and has a frequency f. The clock signal $330_2$ has a frequency of f/2, the clock signal $330_3$ has a frequency of f/2.5, the clock signal $330_4$ has a frequency of f/3.5, the clock signal $330_5$ has a frequency of f/4.5, and the frequency of $330_T$ has a frequency of f/6.5.

The clock signals $330_2$, $330_3$, and $330_3$ are between f/2 and f/4, and the clock signals $330_5$, and $330_T$ are between f/4 and f/8. In view of the above, clock signals $330_2$, $330_3$, and $330_3$ are part of Group 2, and clock signals $330_5$ and $330_T$ are part of Group 3.

In one example, the clock signals $330_2$-$330_T$ are aligned with respect to the clock signal $330_1$. For example, rising and falling edges of the clock signals $330_2$-$330_T$ are aligned with the respect to the clock signal $330_1$. In one example, each of the rising and falling edges of the clock signals $330_2$-$330_T$ are mapped to the closest rising edge of the clock signal $330_1$. For example, FIG. 4 illustrates the mapping of rising and falling edges of the clock signals $330_2$-$330_T$ to the rising edges of the clock signal $330_1$.

In one example, two or more of the clock signals $330_2$-$330_T$ may be combined using a logic element to generate a divided clock signal. In an example, where the clock signals $330_2$ and $330_3$ are combined via a logic element to generate a divided clock signal, the distance between rising edges of the divided clock signals is at least 2 as the frequency of the clock signals $330_2$ and $330_3$ is between f/2 and f/4. The distance between rising edges of the divided clock signal corresponds to the distance between rising edges of the realigned clock signals. In examples, where the rising and falling edges of the realigned clock signals are mapped to every 4 rising edges of the clock signal $330_1$, the distance between the rising edges of the divided clock signal is 4. For example, the rising edges of a divided clock signal generated from the clock signals $330_5$ and $330_T$ have a distance of 4 rising edges of the clock signal $330_1$. Further, the distance between rising edges of a divided clock signal generated from realigned clock signals remains constant.

Figure 5:
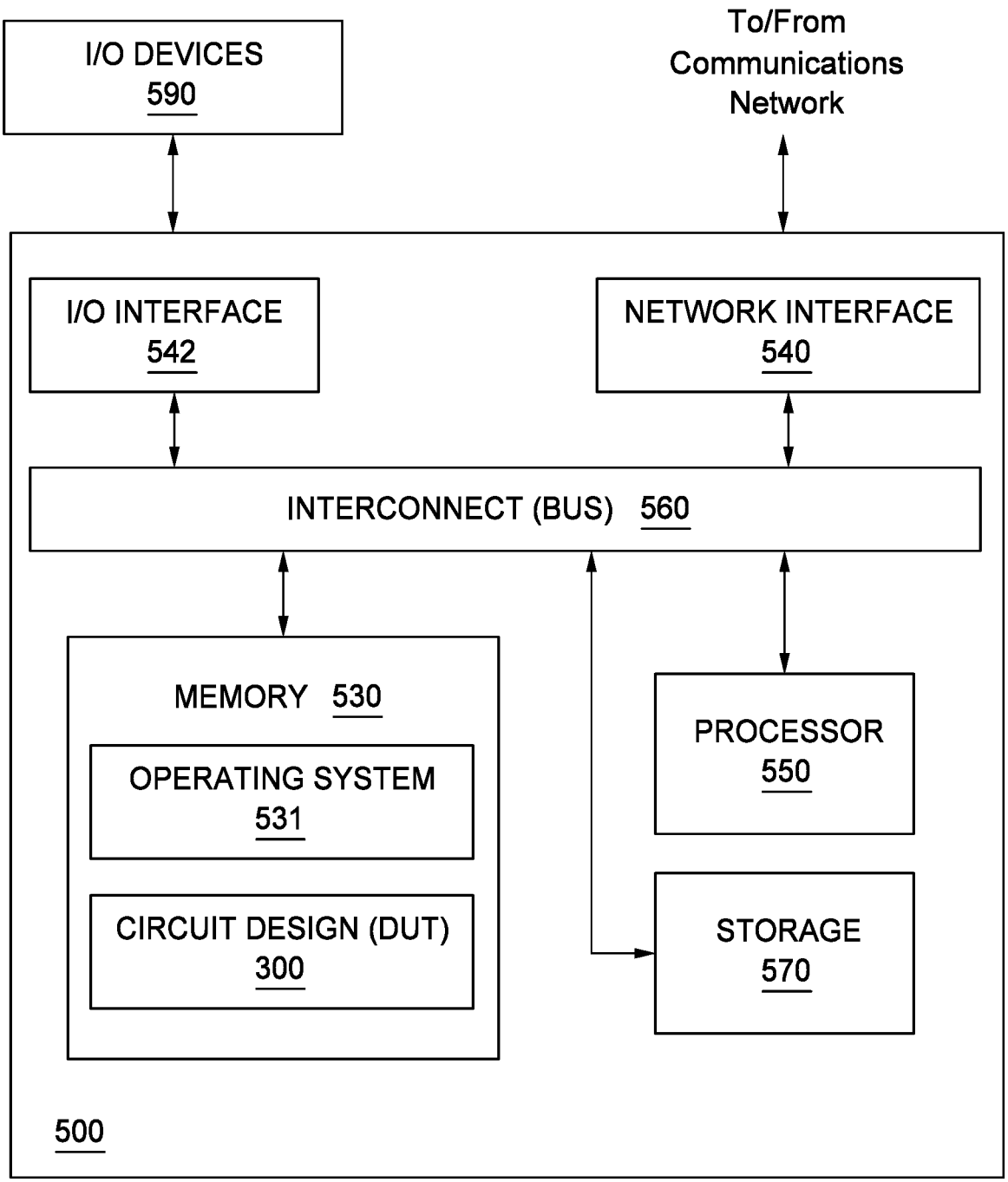
FIG. 5 is a block diagram of a compiler system, according to one or more examples.

FIG. 5 illustrates a compiler system 500 according to one or more examples. In one example, the compiler system 500 is configured similar to the compiler 810 of FIG. 8. As shown, the compiler system 500 includes, without limitation, a computer processor 550 (e.g., a central processing unit), a network interface 540, and memory 530. The compiler system 500 may also include an input/output (I/O) device interface 542 connecting I/O devices 590 (e.g., keyboard, display and mouse devices) to the compiler system 500.

Figure 9:
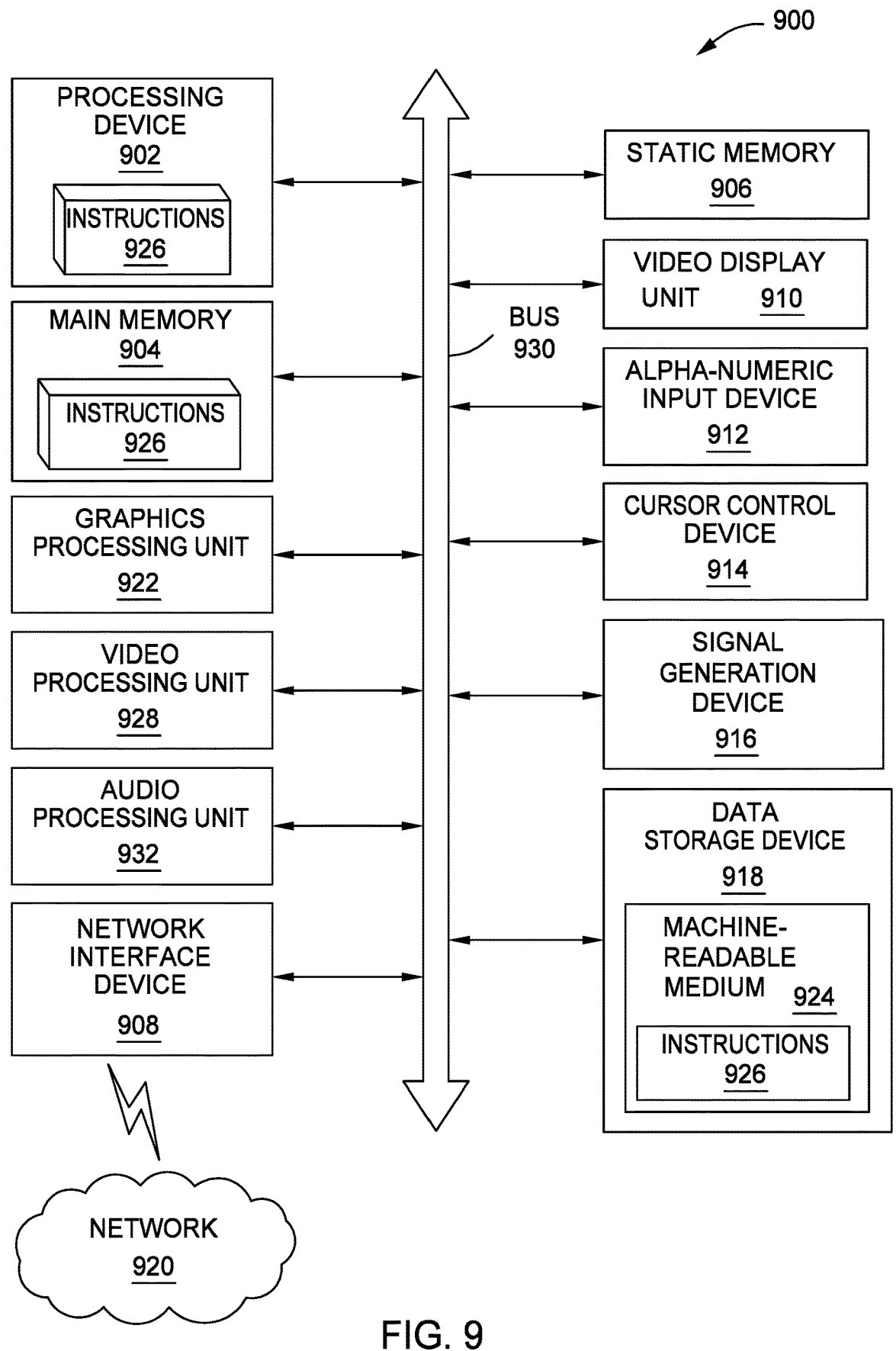
FIG. 9 depicts a diagram of an example computer system in which embodiments of the present disclosure may operate.

The computer processor 550 is configured similar to the processing device 902 of FIG. 9. In one or more examples, the computer processor 550 retrieves and executes programming instructions stored in the memory 530 (e.g., a non-transitory computer readable medium). Similarly, the computer processor 550 stores and retrieves application data residing in the memory 530. A bus 560 facilitates transmission, such as of programming instructions and application data, between the computer processor 550, I/O device interface 542, storage 570, network interface 540, and memory 530. The bus 560 is configured similar to the bus 930 of FIG. 9. The computer processor 550 is included to be representative of a single processor, multiple processors, a single processor having multiple processing cores, and the like. Further, the memory 530 and the storage 570 are generally included to be representative of volatile and non-volatile memory elements. For example, the memory 530 and the storage 570 can include random access memory and a disk drive storage device. Although shown as a single unit, the memory 530 or the storage 570 may be a combination of fixed and/or removable storage devices, such as magnetic disk drives, flash drives, removable memory cards or optical storage, network attached storage (NAS), or a storage area-network (SAN). The storage 570 may include both local storage devices and remote storage devices accessible via the network interface 540. In one example, the memory 530 and/or the storage 570 are configured similar to one or more of the main memory 904 of FIG. 9, the data storage device 918 of FIG. 9, or the machine-readable medium 924 of FIG. 9.

As shown, the memory 530 includes an operating system 531. The operating system 531 may facilitate receiving input from and providing output to various components. For example, the network interface 540 can be used to transmit and/or receive a circuit design. The network interface 540 is configured similar to the network interface device 908 of FIG. 9.

Figure 6:
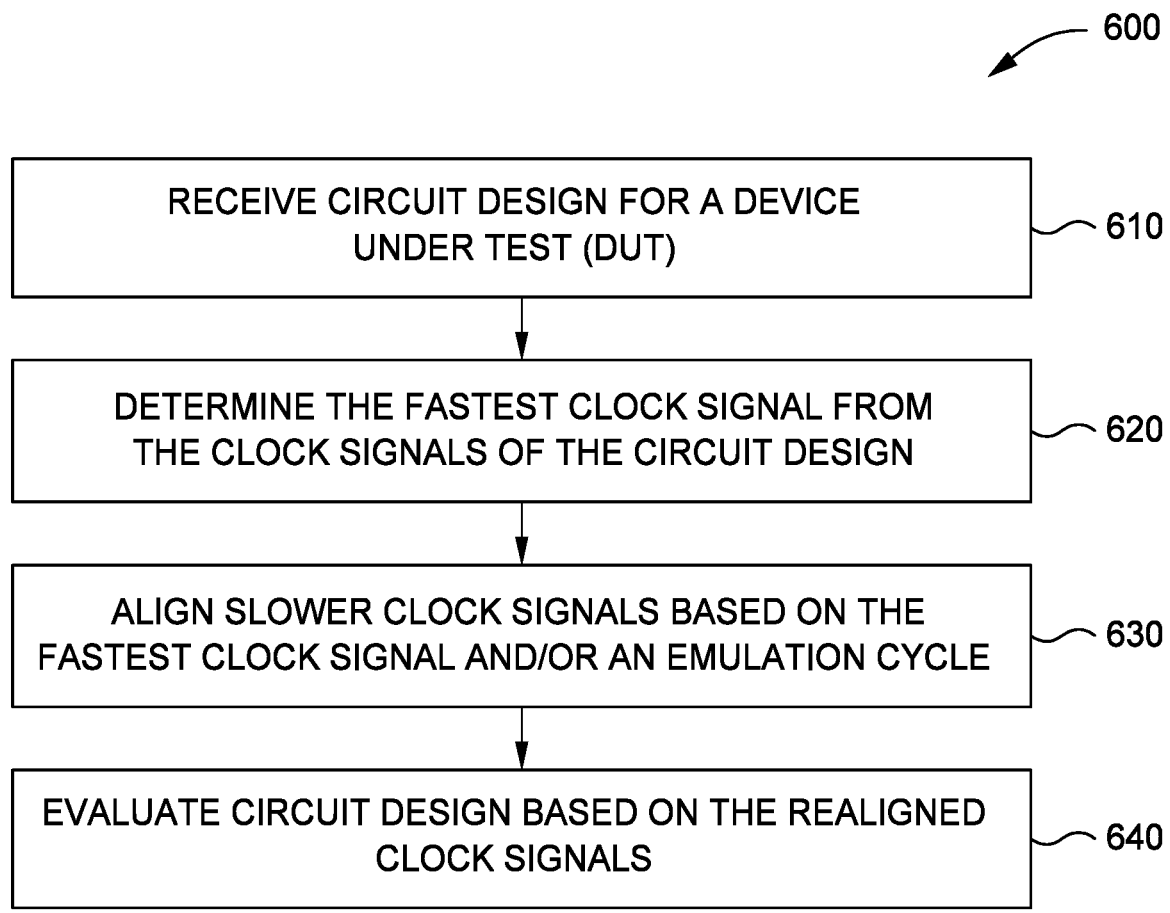
FIG. 6 illustrates a flowchart of a method for aligning data path clock signals a circuit design, according to one or more examples.

FIG. 6 illustrates a flowchart of a method 600 for generating a realigning clock signals for emulation of a DUT, according to one or more examples. The method 600 is performed by the compiler system 500. For example, the compiler system 500 executes one or more instructions stored within the memory 530 to perform the method 600. The method 600 realigns slower clock signals onto faster clock signals as described above with regard to FIGS. 1-4. In one example, the method 600 is performed as part of analysis and extraction 726 of FIG. 7.

At 610 of the method 600, a circuit design (e.g., DUT 300) is obtained by the compiler system 500. The DUT 300 may be a digital design file that includes clock signal information. The compiler system 500 may obtain the DUT 300 from the memory 530 or from another system connected to the compiler system 500.

At 620 of the method 600, the compiler system 500 determines that one or more of the clock signals 330 is faster than the other clock signals 330. For example, the clock signal $330_1$ is determined to be faster than the clock signals $330_2$-$330_T$. In one example, the compiler system 500 compares the frequencies of the clock signals 330 to each other to determine the fastest clock signal. Based on the comparison, the clock signal $330_1$ is determined to be faster than the other clock signals $330_2$-$330_T$.

In one example, the slower clock signals, e.g., the clock signals $330_2$-$330_T$, are grouped based on a corresponding frequency ratio with the clock signal $330_1$, e.g., the fastest clock signal. For example, clock signals having a frequency that is less than or equal to one half the frequency of the clock signal $330_1$ are placed in a first group (e.g., Group 1). Clock signals having a frequency that is greater than one half the frequency of the clock signal $330_1$ and less than or equal to one fourth the frequency of the clock signal $330_1$ are placed in a second group (e.g., Group 2). Further, clock signals faster or equal than $1/(2j)$ the clock signal $330_1$ and slower than $1/(2(j-1))$ the clock signal $330_1$, are placed in Group J.

At 640 of the method 600, slower clock signals are aligned with the fastest clock signal and/or emulation cycles. The clock signals are realigned based on the group to which the clock signals are assigned and/or the ratio of the frequency of the slower clock signals to the frequency of the fastest clock signal. In one example, the clock signals that are less than half the frequency of the fastest clock signal are realigned as described with regard to FIG. 2. For example, the rising edges of each of such clock signals are realigned to occur at even emulation cycles. The clock signals that are at least two times slower than the fastest clock signal are realigned as described with regard to FIG. 1. For example, the rising and falling edges of such clock signals are mapped to the closest rising edge of the fastest clock signal. In one example, each clock signal of a common group (e.g., Group 2 as described above) are realigned based on the same rising edges of the fastest clock signal.

At 650 of the method 600, the DUT is evaluated using the realigned clock signals. For example, the realigned clock signals and the DUT are used by an emulation environment (e.g., the emulation environment 800 of FIG. 8) to emulate the operation of the DUT.

Figure 7:
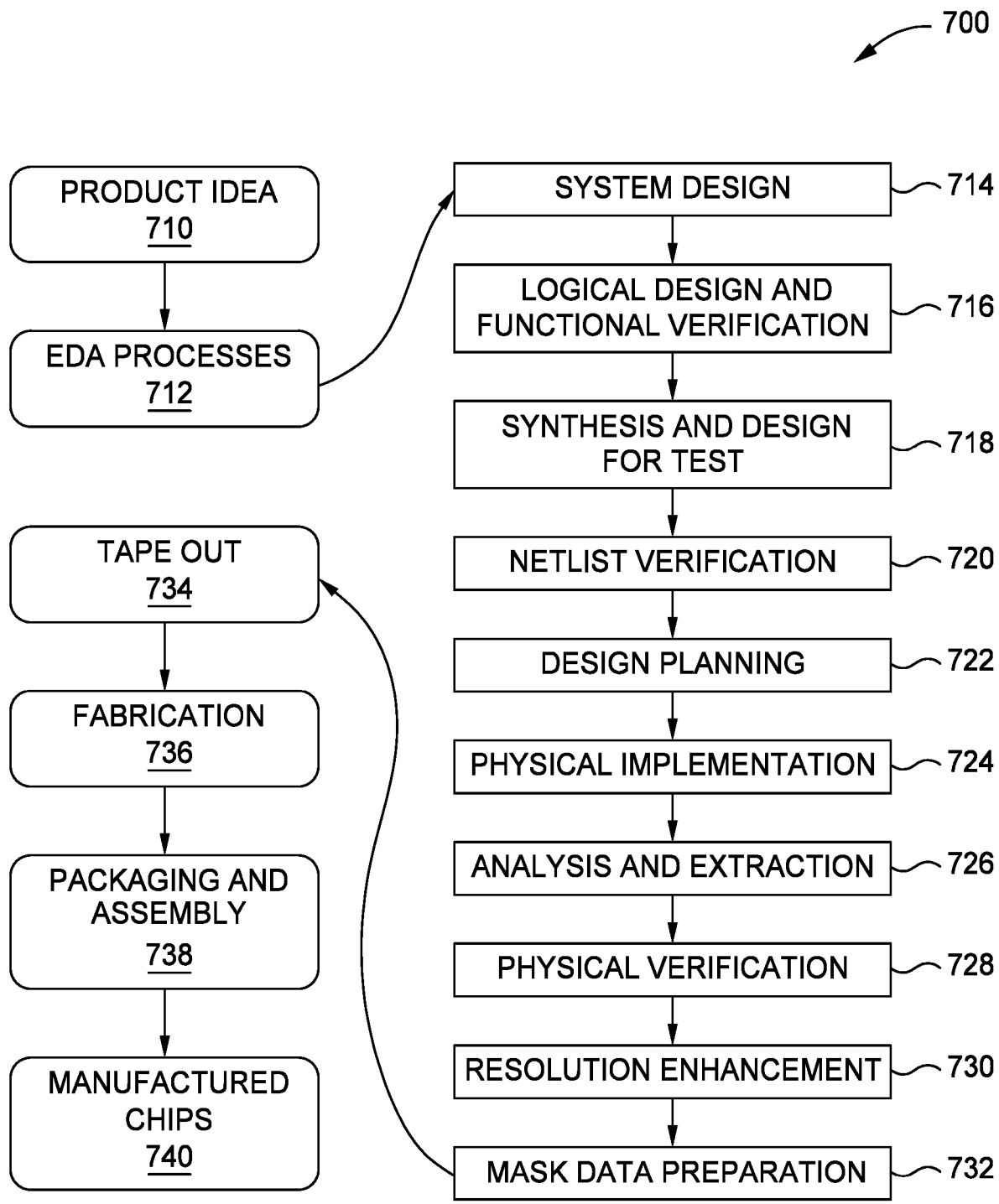
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 7. The processes described by be enabled by EDA products (or EDA systems).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 9, or host system 807 of FIG. 8) may be used to store the programs and data structures that are used by some or all of the EDA products described herein, and products used for development of cells for the library and for physical and logical design that use the library.

Figure 8:
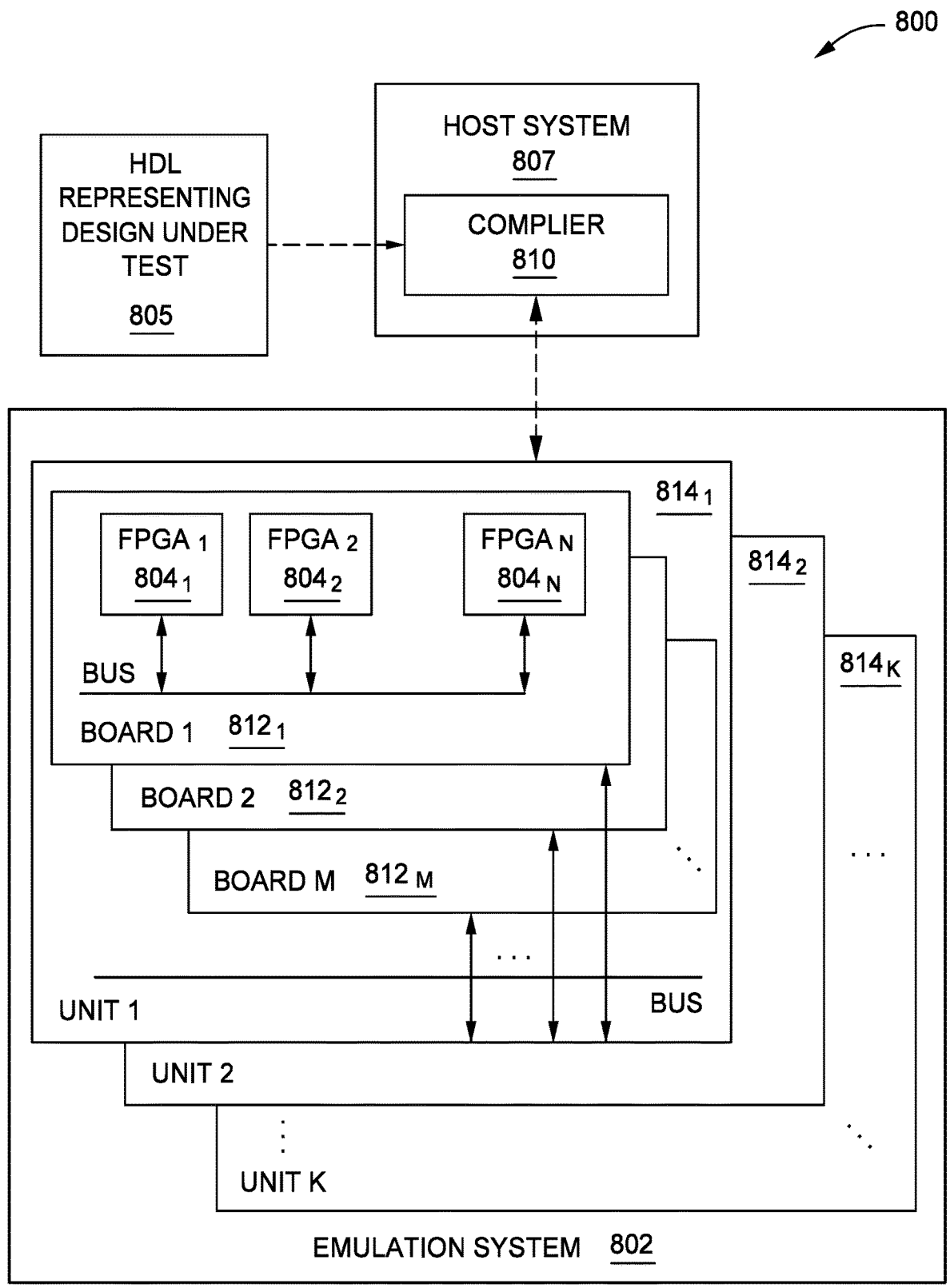
FIG. 8 depicts a diagram of an example emulation system in accordance with some embodiments of the present disclosure.

FIG. 8 depicts a diagram of an example emulation environment 800. An emulation environment 800 may be configured to verify the functionality of the circuit design. The emulation environment 800 may include a host system 807 (e.g., a computer that is part of an EDA system) and an emulation system 802 (e.g., a set of programmable devices such as Field Programmable Gate Arrays (FPGAs) or processors). The host system generates data and information by using a compiler 810 to structure the emulation system to emulate a circuit design. A circuit design to be emulated is also referred to as a Design Under Test ('DUT') where data and information from the emulation are used to verify the functionality of the DUT.

The host system 807 may include one or more processors. In the embodiment where the host system includes multiple processors, the functions described herein as being performed by the host system can be distributed among the multiple processors. The host system 807 may include a compiler 810 to transform specifications written in a description language that represents a DUT and to produce data (e.g., binary data) and information that is used to structure the emulation system 802 to emulate the DUT. The compiler 810 can transform, change, restructure, add new functions to, and/or control the timing of the DUT.

The host system 807 and emulation system 802 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 807 and emulation system 802 can exchange data and information through a third device such as a network server.

The emulation system 802 includes multiple FPGAs (or other modules) such as FPGAs $804_1$ and $804_2$ as well as additional FPGAs to $804_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 802 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $804_1$-$804_N$ may be placed onto one or more boards $812_1$ and $812_2$ as well as additional boards through $812_M$. Multiple boards can be placed into an emulation unit $814_1$. The boards within an emulation unit can be connected using the backplane of the emulation unit or any other types of connections. In addition, multiple emulation units (e.g., $814_1$ and $814_2$ through $814_K$) can be connected to each other by cables or any other means to form a multi-emulation unit system.

For a DUT that is to be emulated, the host system 807 transmits one or more bit files to the emulation system 802. The bit files may specify a description of the DUT and may further specify partitions of the DUT created by the host system 807 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 807 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 807 and/or the compiler 810 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 805 into gate level logic. For a DUT that is to be emulated, the design synthesizer sub-system receives a description of the DUT. If the description of the DUT is fully or partially in HDL (e.g., RTL or other level of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   obtaining a circuit design, the circuit design comprising clock signals, wherein each of the clock signals is a data path clock signal;
   determining, by a processor, that a first clock signal of the clock signals is faster than a second clock signal of the clock signals;
   generating realigned clock signals by aligning rising edges and falling edges of the second clock signal with rising edges of the first clock signal based on determining that the first clock signal is faster than the second clock signal and aligning rising edges of a third clock signal of the clock signals with even cycles of an emulation clock signal, wherein the first clock signal is faster than the third clock signal and the third clock signal is faster than the second clock signal; and
   emulating the circuit design using the realigned clock signals.

2. The method of claim 1, wherein aligning the rising edges and falling edges of the second clock signal comprises aligning a first rising edge of the rising edges of the second clock signal with a first rising edge of the first clock signal, and a first falling edge of the falling edges of the second clock signal with a second rising edge of the first clock signal.

3. The method of claim 2, wherein the first clock signal is faster than a fourth clock signal of the clock signals, and wherein the method further comprises:
   aligning rising edges and falling edges of the fourth clock signal with rising edges of the first clock signal.

4. The method of claim 3, wherein a frequency of the second clock signal is greater than a frequency of the fourth clock signal, and wherein aligning the rising edges and the falling edges of the fourth clock signal comprises aligning a first rising edge of the rising edges of the fourth clock signal with the first rising edge of the first clock signal, and aligning a first falling of the falling edges of the fourth clock signal with a third rising edge of the first clock signal, the third rising edge of the first clock signal occurs subsequent to the second rising edge of the first clock signal.

5. The method of claim 2, wherein a frequency of the first clock signal is higher than a frequency of a fifth clock signal of the clock signals, and a frequency of the second clock signal is greater than a frequency of the fifth clock signal, wherein the method further comprises aligning a first rising edge of a fourth the fifth clock signal with the first rising edge of the first clock signal, and a first falling edge of the fifth clock signal with the second rising edge of the first clock signal.

6. The method of claim 1, further comprising:
determining that the first clock signal is faster than a sixth clock signal of the clock signals and a seventh clock signal of the clock signals; and
grouping the second clock signal, the sixth clock signal, and seventh clock signal based on a ratio of a frequency of the first clock signal to a frequency of the second clock signal, a ratio of a frequency of the first clock signal to a frequency of the sixth clock signal, and a ratio of a frequency of the first clock signal to a frequency of the seventh clock signal.

7. A system comprising:
a memory storing instructions; and
a processor, coupled with the memory and configured to execute the instructions, the instructions when executed cause the processor to:
obtain a circuit design, the circuit design comprising clock signals, wherein each of the clock signals is a data path clock signal;
determine that a first clock signal of the clock signals is faster than a second clock signal of the clock signals;
generate realigned clock signals by aligning rising edges and falling edges of the second clock signal with rising edges of the first clock signal based on determining that the first clock signal is faster than the second clock signal and aligning rising edges of a third clock signal of the clock signals with even cycles of an emulation clock signal, wherein the first clock signal is faster than the third clock signal and the third clock signal is faster than the second clock signal; and
emulate the circuit design using the realigned clock signals.

8. The system of claim 7, wherein aligning the rising edges and falling edges of the second clock signal comprises aligning a first rising edge of the rising edges of the second clock signal with a first rising edge of the first clock signal, and a first falling edge of the falling edges of the second clock signal with a second rising edge of the first clock signal.

9. The system of claim 8, wherein the processor is further configured to:
determine that the first clock signal is faster than a fourth clock signal of the clock signals; and
align rising edges and falling edges of the fourth clock signal with rising edges of the first clock signal based on determining that the first clock signal is faster than the fourth clock signal.

10. The system of claim 9, wherein a frequency of the second clock signal is greater than a frequency of the fourth clock signal, and wherein aligning the rising edges and the falling edges of the fourth clock signal comprises aligning a first rising edge of the rising edges of the fourth clock signal with the first rising edge of the first clock signal, and aligning a first falling of the falling edges of the fourth clock signal with a third rising edge of the first clock signal, the third rising edge of the first clock signal occurs subsequent to the second rising edge of the first clock signal.

11. The system of claim 8, wherein the processor is further configured to:
determine that the first clock signal is faster than a fifth clock signal of the clock signals; and
align a first rising edge of the fifth clock signal with the first rising edge of the first clock signal, and a first falling edge of the fifth clock signal with the second rising edge of the first clock signal.

12. The system of claim 7, wherein the processor is further configured to:
determine that the first clock signal is faster than a sixth clock signal of the clock signals and a seventh clock signal of the clock signals; and
group the second clock signal, the sixth clock signal, and seventh clock signal based on a ratio of a frequency of the first clock signal to the frequency of the second clock signal, a ratio of a frequency of the first clock signal to the frequency of the sixth clock signal, and a ratio of a frequency of the first clock signal to the frequency of the seventh clock signal.

13. A non-transitory computer readable medium comprising stored instructions, which when executed by a processor, cause the processor to:
obtain a circuit design, the circuit design comprising clock signals, wherein each of the clock signals is a data path clock signal;
determine that a first frequency of a first clock signal of the clock signals is higher than a second frequency of a second clock signal of the clock signals and a third frequency of a third clock signal of the clock signals;
group the second clock signal and the third clock signal based a ratio of the first clock signal relative to the second clock signal and the third clock signal into one or more groups;
align the second clock signal and the third clock signal with the first clock signal based on the grouping of the second clock signal and the third clock signal to generate realigned clock signals; and
emulate the circuit design using the realigned clock signals.

14. The non-transitory computer readable medium of claim 13, wherein aligning the second clock signal with the first clock signal comprises aligning a first rising edge of the second clock signal with a first rising edge of the first clock signal, and a first falling edge of the second clock signal with a second rising edge of the first clock signal.

15. The non-transitory computer readable medium of claim 14, wherein aligning the third clock signal with the first clock signal comprises aligning a first rising edge of the third clock signal with a first rising edge of the first clock signal, and a first falling edge of the third clock signal with a third rising edge of the first clock signal.

16. The non-transitory computer readable medium of claim 15, wherein the second frequency of the second clock signal is greater than the third frequency of the third clock signal, and wherein the third rising edge of the first clock signal occurs subsequent to the second rising edge of the first clock signal.

17. The non-transitory computer readable medium of claim 14, wherein the processor is further configured to:
determine that the first frequency of the first clock signal is higher than a fourth frequency of a fourth clock signal of the clock signals;

determine that the second frequency of the second clock signal is higher than the fourth frequency of the fourth clock signal; and align a first rising edge of the fourth clock signal with the first rising edge of the first clock signal, and a first falling edge of the fourth clock signal with the second rising edge of the first clock signal.

18. The non-transitory computer readable medium of claim 15, the processor is further configured to:

determine that the first frequency of the first clock signal is higher than a fifth frequency of a fifth clock signal of the clock signals; and align rising edges of the fifth clock signal with even cycles of an emulation clock signal.

* * * * *